US011642766B2

(12) United States Patent
Jones

(10) Patent No.: US 11,642,766 B2
(45) Date of Patent: May 9, 2023

(54) COUPLING TOOL AND METHOD OF USE

(71) Applicant: Crenshaw Tools LLC, Hillsboro, MO (US)

(72) Inventor: Matthew K. Jones, Hillsboro, MO (US)

(73) Assignee: CRENSHAW TOOLS LLC, Hillsboro, MO (US)

( * ) Notice: Subject to any disclaimer, the term of this patent is extended or adjusted under 35 U.S.C. 154(b) by 444 days.

(21) Appl. No.: 16/781,501

(22) Filed: Feb. 4, 2020

(65) Prior Publication Data

US 2020/0246948 A1 Aug. 6, 2020

Related U.S. Application Data

(60) Provisional application No. 62/800,943, filed on Feb. 4, 2019.

(51) Int. Cl.

| | |
|---|---|
| *B25B 27/00* | (2006.01) |
| *B25B 27/10* | (2006.01) |
| *F16L 55/07* | (2006.01) |
| *F16L 55/18* | (2006.01) |
| *B25B 9/02* | (2006.01) |
| *B25B 27/06* | (2006.01) |
| *B25B 27/14* | (2006.01) |

(52) U.S. Cl.
CPC ............... *B25B 27/10* (2013.01); *B25B 9/02* (2013.01); *B25B 27/06* (2013.01); *B25B 27/14* (2013.01); *F16L 55/07* (2013.01); *F16L 55/18* (2013.01)

(58) Field of Classification Search
CPC ......... B25B 27/00; B25B 27/20; B25B 27/14; B66F 15/00; F16L 55/07; F16L 55/00
See application file for complete search history.

(56) References Cited

U.S. PATENT DOCUMENTS 1,309,734 A * 7/1919 Hemfling ................ B66F 15/00
  D8/89
2,420,458 A 5/1947 Barker
(Continued)

OTHER PUBLICATIONS

Coupling Spanner for Nakakima DN 40, https://myviking.viking-life.com/en/Marine-fire/Fire-Fighting-Equipment/Coupling-and-adapters/p/1045109 (downloaded Apr. 6, 2021).

(Continued)

*Primary Examiner* — Lee D Wilson
(74) *Attorney, Agent, or Firm* — David E. Crawford; Crawford I.P. Law

(57) ABSTRACT

A slip coupling tool having an interior surface sized for receiving a pipe. The coupling tool includes a semi-annular collar sized to engage an exterior surface of the pipe. The collar extends to a rearward end face sized and shaped for aligning with an end of the slip coupling when the collar receives the pipe and the inner surface of the collar engages an exterior surface of the pipe. The slip coupling tool includes a striking plate extending outward from the collar. The striking plate has an impact surface spaced from the collar for impacting the coupling tool to drive the slip coupling into position along the pipe. The slip coupling tool includes a handle extending outward from the collar for manipulating the tool into position while impacting the impact surface of the striking plate to drive the slip coupling into position along the pipe.

10 Claims, 13 Drawing Sheets

(56) References Cited

U.S. PATENT DOCUMENTS

| | | | | |
|---|---|---|---|---|
| D532,273 S | * | 11/2006 | Yoson | D8/88 |
| D754,499 S | * | 4/2016 | Blood | D8/14 |
| 10,251,501 B2 | * | 4/2019 | Capobianco | A47G 23/0208 |
| 10,882,725 B2 | * | 1/2021 | Plunkett | B66F 15/00 |
| 2007/0045599 A1 | * | 3/2007 | Bilyeu | B66F 15/00 |
| | | | | 254/25 |
| 2010/0170072 A1 | * | 7/2010 | Elzey | B25B 27/14 |
| | | | | 29/278 |
| 2020/0246948 A1 | * | 8/2020 | Jones | B25B 27/06 |

OTHER PUBLICATIONS

Dixon Sanitary SP RJT Spanner Wrenches, https://www.jmesales.com/dixon-bradford-sp-rjt-spanner-wrenches/ (downloaded Apr. 6, 2021).

* cited by examiner

COUPLING TOOL AND METHOD OF USE

CROSS-REFERENCE TO RELATED APPLICATION

The present application claims priority to U.S. Provisional Patent Application 62/800,943 entitled, "COUPLING TOOL AND METHOD OF USE" filed Feb. 4, 2019, which is hereby incorporated by reference in its entirety.

BACKGROUND

The present invention generally relates to pipe couplings, and more particularly, to a coupling tool for assembling slip couplings on pipes and methods of using the tool.

Lateral sewer lines extend from residential and commercial buildings to larger main sewer lines that deliver waste to processing plants where waste is treated and solids are removed before processed water is returned to a natural body of water such as a river, lake, or ocean. Lateral sewer lines become damaged, for example from tree root ingress, cycles of freezing and thawing, and from being struck by tools and equipment. In the past, damaged lateral sewer lines were repaired by excavating to expose a damaged section, removing the damaged section, fitting a replacement section in place, and coupling each end of the replacement section to a corresponding adjacent end of the original undamaged sewer line. Conventional couplings such as Fernco® pipe couplings (designated by the letter F in FIG. 1) were used to couple each end of the replacement section to the corresponding adjacent end of the undamaged line. Fernco is a U.S. federally registered trademark of Fernco, Inc. of Davidson, Mich. Such couplings are compliant, allowing for misalignment and movement. An example of a repair made with these conventional couplings is shown in FIG. 1. Over time these couplings deteriorate, allowing waste to leak. To alleviate leakage from deterioration, some building codes require the coupling to be encased in cement. Not only is the per-unit price of a conventional coupling expensive, but the labor and materials for encasing the coupling in cement also adds to their cost.

Conventional slip couplings can be used in place of the compliant Fernco® pipe couplings. To install a slip coupling, an end of the first pipe is coated with adhesive and the slip coupling is inserted over the coated end. The end of the first pipe having the slip coupling is aligned with the end of the second pipe. The end of the second pipe is coated with adhesive before the slip coupling is driven toward the coated end of the second pipe. The slip coupling is centered on the abutted ends of the first and second pipes. Because the slip coupling has a far greater life than the compliant conventional couplings, building codes generally do not require the slip coupling to be encased in cement. Further, slip couplings are substantially less expensive than Fernco® pipe couplings. Thus, there are substantial advantages to using slip couplings. However, driving the couplings onto the end of the first pipe and onto the end of the second pipe frequently requires the coupling to be tapped into place with a hammer. To avoid damaging the slip coupling or the pipes, the worker may use a piece of scrap wood, positioning the wood adjacent the coupling and striking the wood with the hammer. Over time, the scrap wood chips and splits, requiring replacement. Further, depending upon the size and shape of the wood, the hammer may contact the pipe or coupling, causing damage and requiring removal and further repair.

Thus, there is a need for a tool to eliminate or reduce the various disadvantages of conventional tools and methods described above.

SUMMARY

In one aspect, the present disclosure includes a slip coupling tool for use when positioning a tubular slip coupling on pipe having an exterior surface. The slip coupling has an interior surface sized for receiving the pipe extending between opposite ends. The coupling tool comprises a semi-annular collar having a circular inner surface sized to engage the exterior surface of the pipe. The inner surface extends between a forward end face and a rearward end face opposite the forward end face. The rearward end face is sized and shaped for aligning with a first end of the opposite ends of the slip coupling when the interior surface of the slip coupling receives the pipe and the inner surface of the collar engages the exterior surface of the pipe. The slip coupling tool also includes a striking plate extending outward from the forward end face of the collar. The striking plate has an impact surface spaced from the collar for impacting the coupling tool to drive the slip coupling into a predetermined position along the pipe. In addition, the slip coupling tool comprises a handle extending outward from the collar for engaging the inner surface of the collar with the exterior surface of the pipe and aligning the rearward end face of the collar with the first end of the slip coupling while impacting the impact surface of the striking plate to drive the slip coupling into the predetermined position along the pipe.

In another aspect, the present disclosure includes a method of repairing a pipe using a slip coupling tool. The method includes removing a damaged section of pipe so opposing ends of original pipe are axially separated by a distance and selecting a replacement pipe section of a length generally equal to the distance between the opposing ends of original pipe. The replacement section is offset from a first end of the opposing ends of original pipe and an area of the replacement pipe section is coated with an adhesive system. An area of an interior of a slip coupling is coated with the adhesive system before slipping the coated slip coupling over the coated area of the replacement pipe section. The replacement pipe section is aligned adjacent the first end of the opposing ends of original pipe. An area of the first end of the opposing ends of original pipe is coated with an adhesive system and a pipe coupling tool is positioned adjacent the slip coupling before impacting the slip coupling to drive the coupling over the first end of said opposing ends of original pipe.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
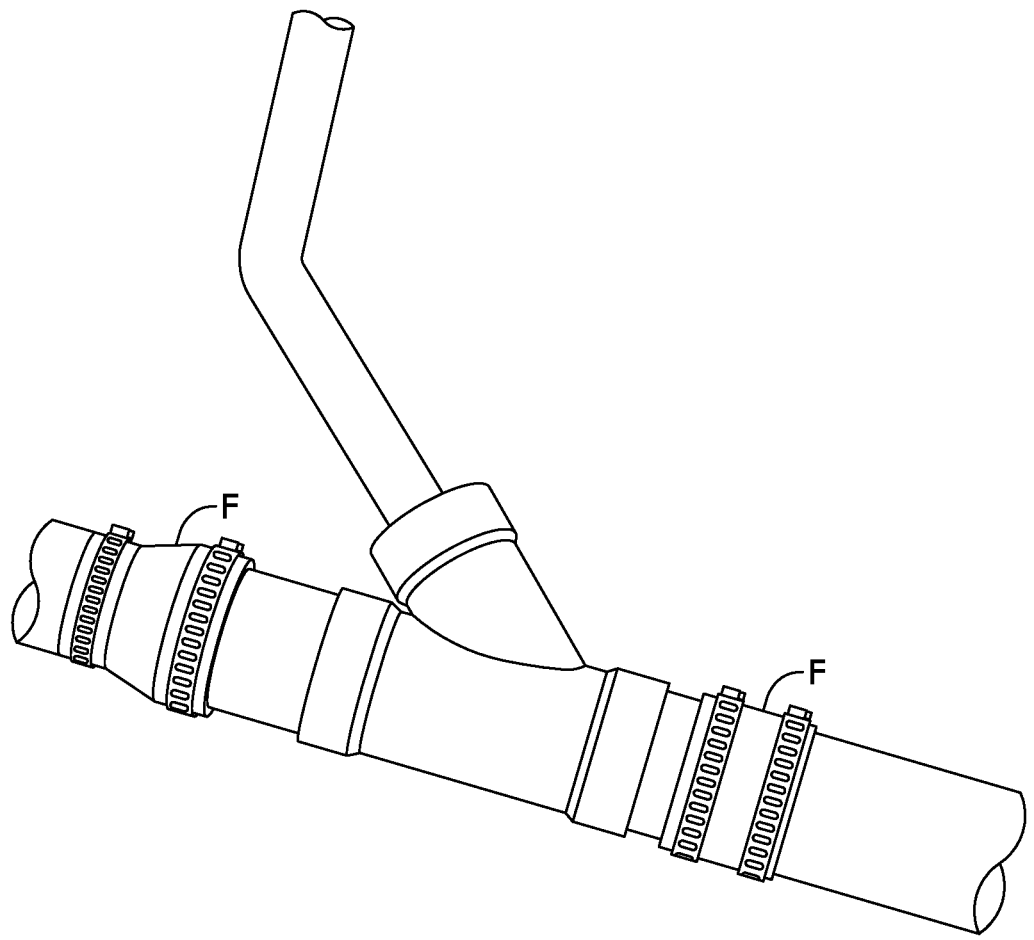
FIG. 1 is a perspective of a lateral sewer line repair made using conventional couplings.
Figure 2:
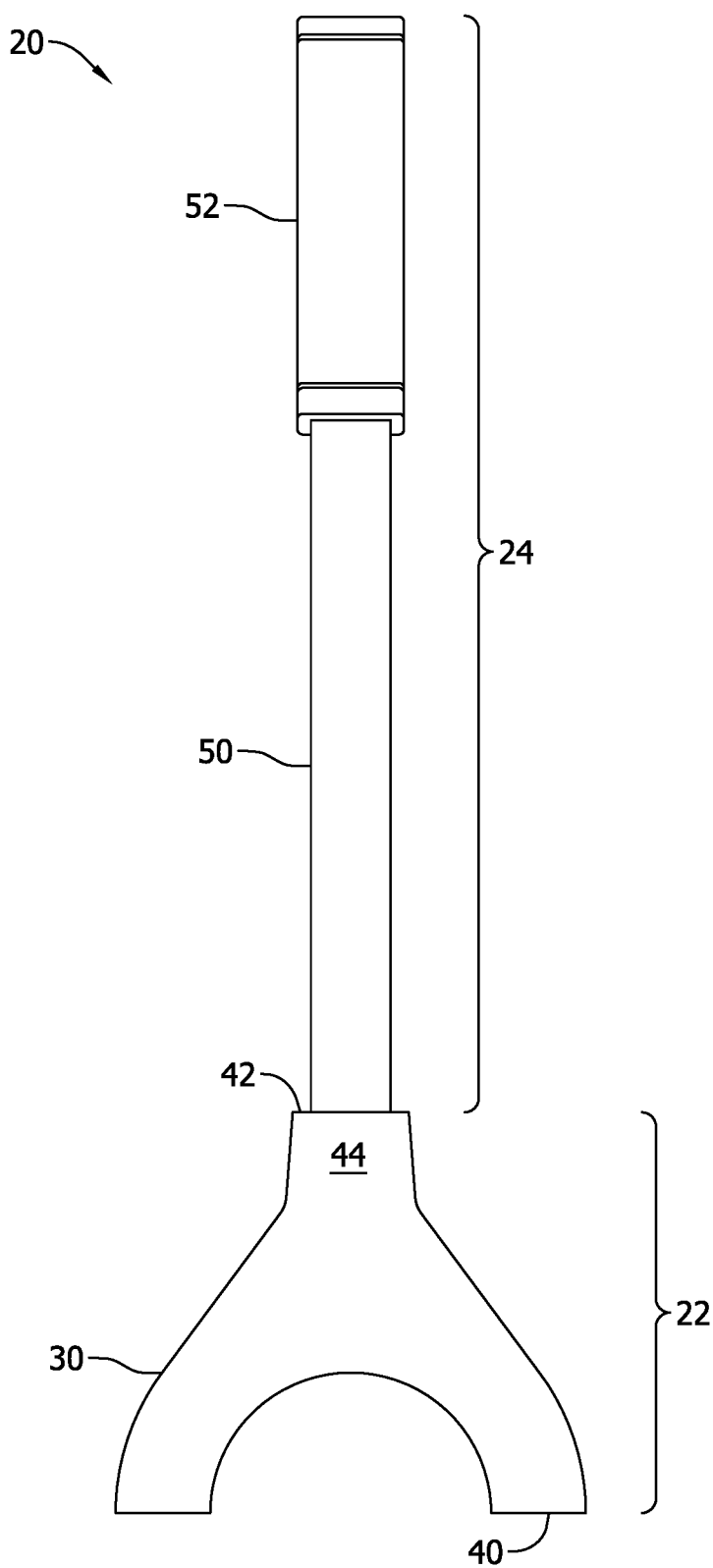
FIG. 2 is a perspective generally illustrating a front of a coupling tool.
Figure 3:
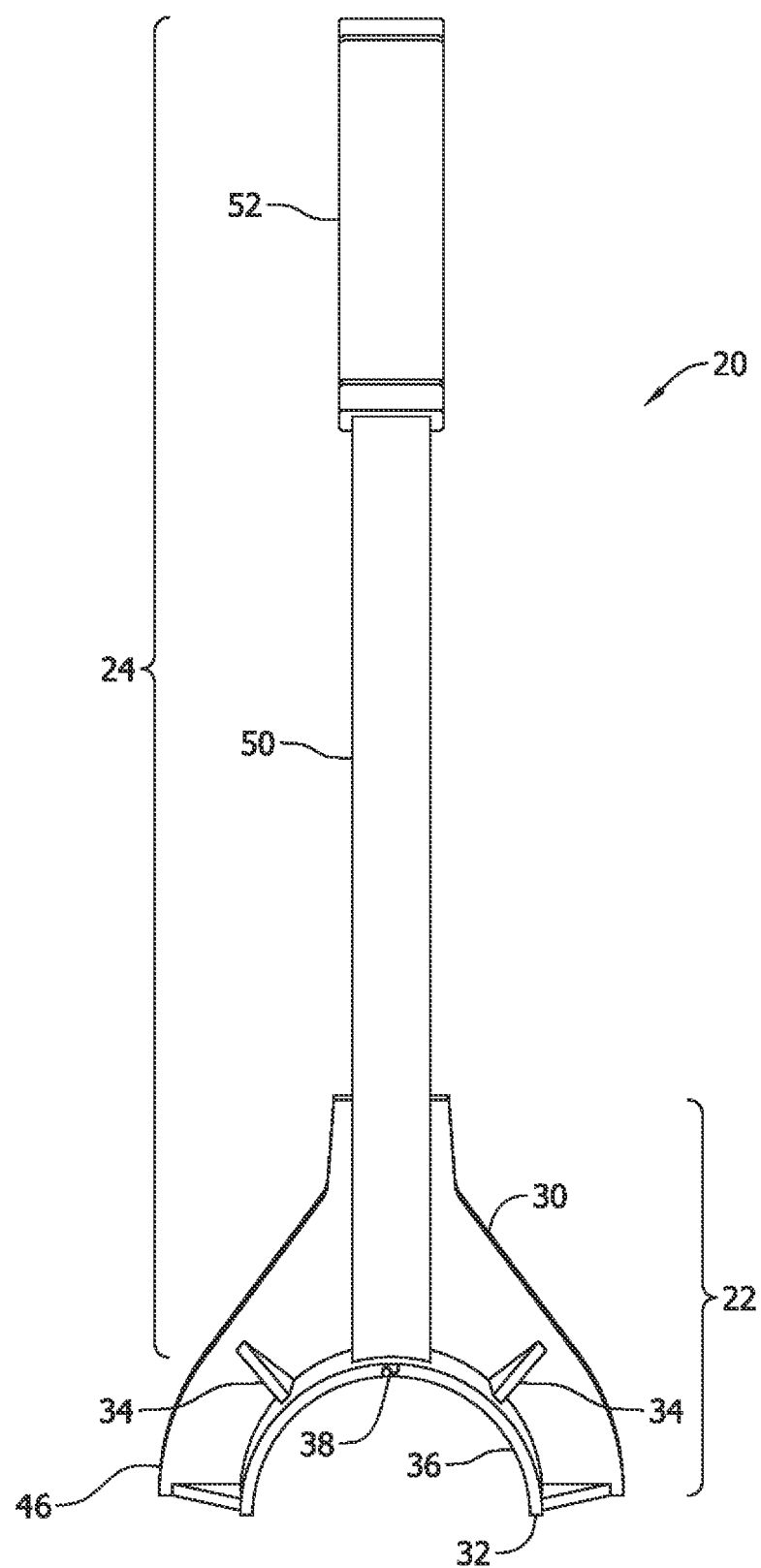
FIG. 3 is a perspective generally illustrating a rear of the tool.

Referring to FIGS. 2 and 3, a slip coupling tool is designated in its entirety by the reference number 20. The tool 20 generally comprises a head (generally designated by 22) and a handle (generally designated by 24). The head 22 includes a yoke-shaped striking plate 30, a semi-annular collar 32, and triangular gussets 34. As used in this document, the prefix "semi-" is intended to include half or less. For example, semi-circular is intended to mean half or a lesser portion of a circle.

Figure 4:
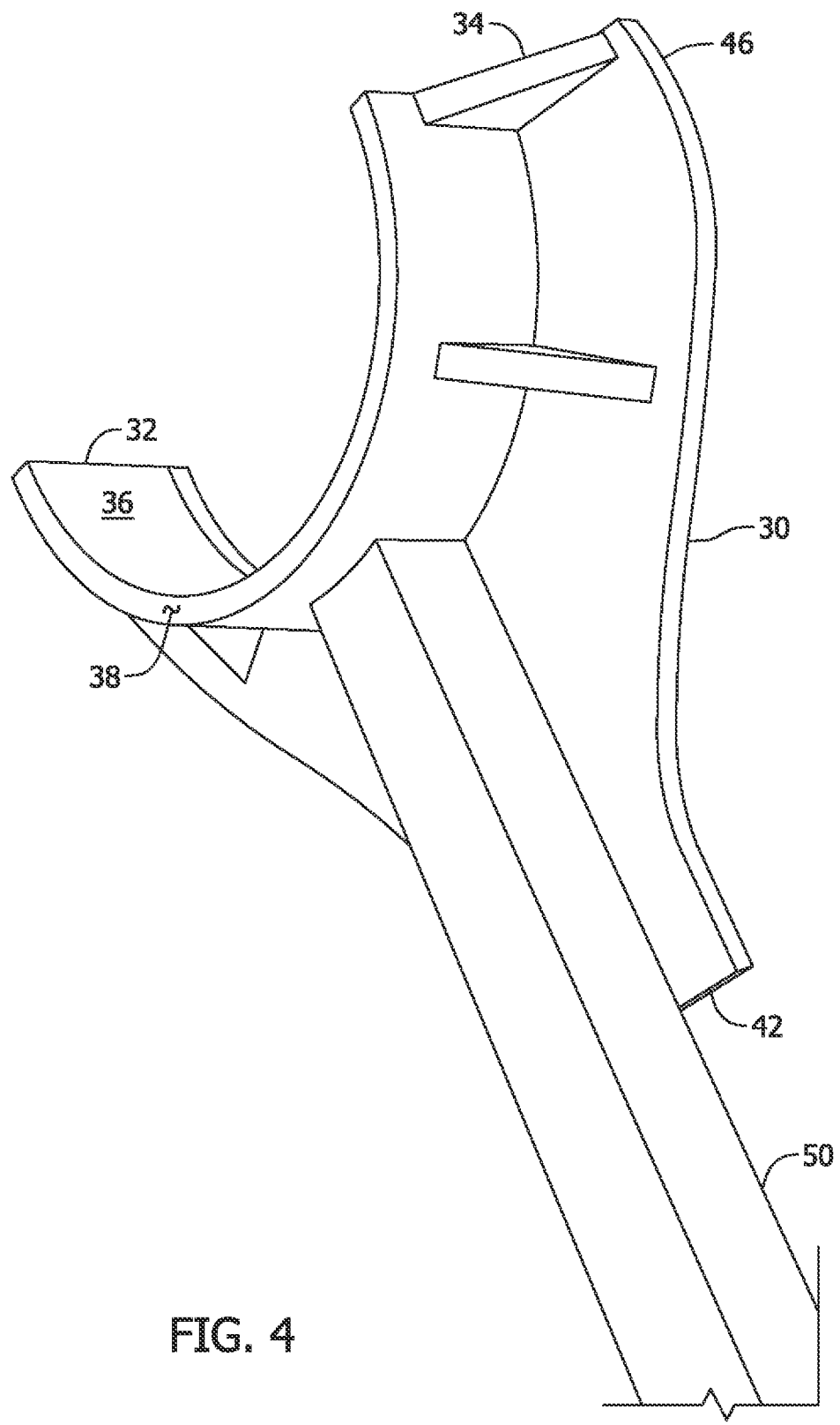
FIG. 4 is a fragmentary perspective illustrating a head of the tool.
Figure 5:
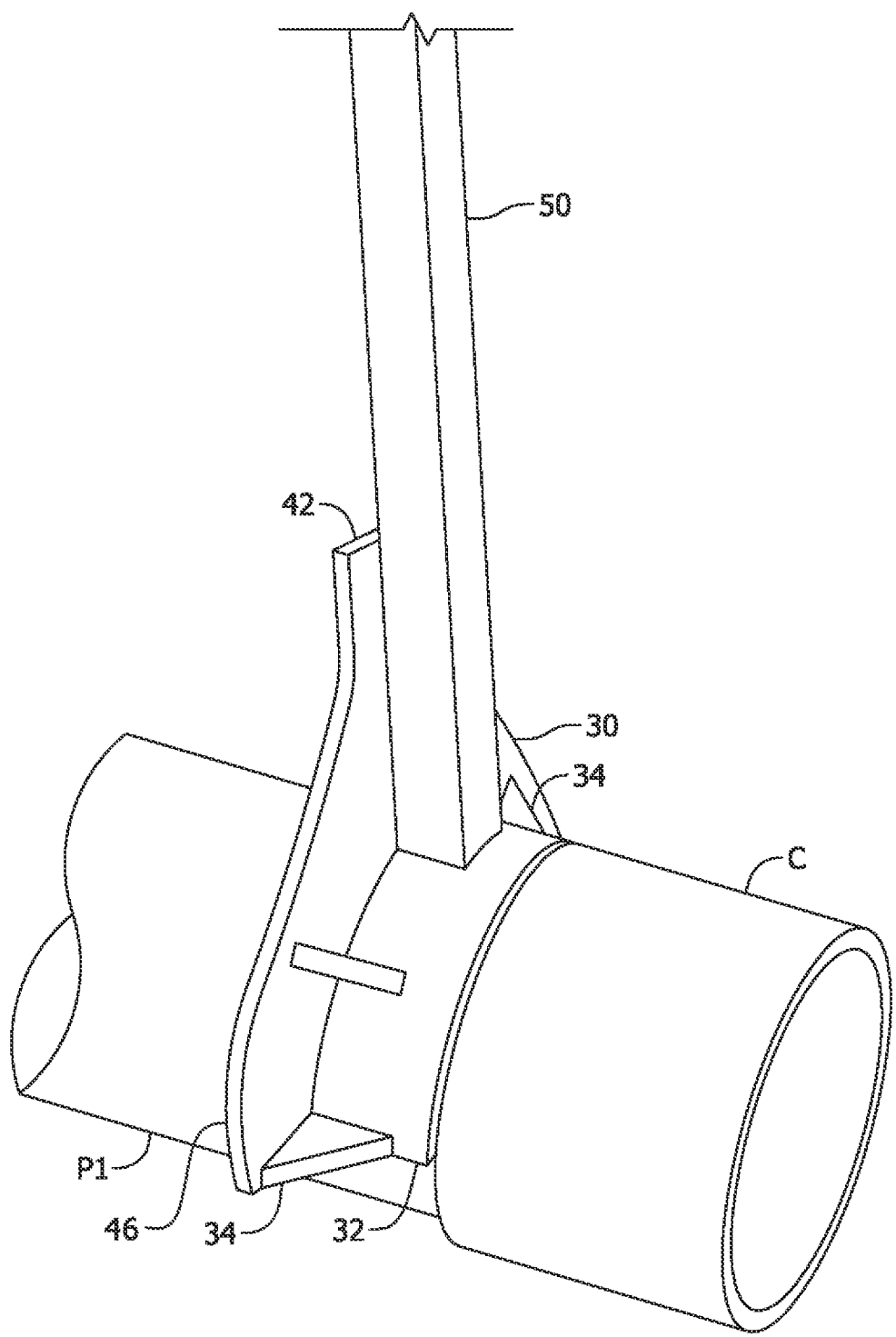
FIG. 5 is a fragmentary perspective of the tool in position on a pipe adjacent a coupling.

As illustrated in FIGS. 3-5, the collar 32 has a semi-circular inner surface 36 sized and shaped to engage the exterior surface of a pipe P1 with which the tool 20 is intended to be used. In some examples, the inner surface 36 is sized and shaped to engage the exterior surface of a pipe having a conventional standard diameter. Further, the collar 32 has a rearward end face 38 sized and shaped to be aligned with a corresponding end of the slip coupling C when the interior surface of the slip coupling receives the pipe P1 and engages the exterior surface of the pipe. Although not visible in the drawings, those skilled in the art will appreciate that the collar 36 has a forward end face opposite the rearward end face 38. When the inner surface 36 of the collar 32 receives the pipe P1 and aligns the end face 38 with the end of the slip coupling C, so impact delivered to the head 22 is precisely conveyed to the slip coupling.

As shown in FIGS. 2-6, the striking plate 30 extending outward from a semi-circular inner margin corresponding to and overlapping the forward end face of the collar 32 at an inner end 40 of the plate to an outer end 42. An impact surface 44 adjacent the outer end 42 is the spaced from the collar 32 by a distance to reduce a possibility of unintentionally impacting the pipe when striking the impact surface to drive the slip coupling C into a predetermined position along the pipe P. Further, the striking plate 30 is sized and shaped to allow the worker to forcefully strike the plate with a hammer while allowing sufficient clearance between the hammer and the pipe or coupling to reduce a likelihood of striking the pipe or coupling with the hammer. In some examples, the impact surface 44 is spaced from the collar 32 by a distance greater than two inches, and in other examples by a distance of three, four, or more inches. The inner end 40 of the impact plate 30 includes a semi-annular flange 46 extending outward from the forward end face of the collar 32. The flange 46 includes the semi-circular inner margin aligned with the forward end face of the collar 32 so the plate 30 transmits impact loads to the collar when the impact surface 44 of the coupling tool 20 is struck (e.g., by a hammer H) to drive the slip coupling C into the predetermined position along the pipe. Gussets 34 extend between the striking plate 30 and the collar 32 to strengthen the flange 46 against bending when transmitting impacts from the striking plate to the collar. Although the components forming the head 22 of the tool 29 (i.e., the striking plate 30, collar 32, and gussets 34) may be made from other materials, the components of the illustrated tool 20 are made from quarter-inch steel plate cut and formed to shape using conventional methods. The components are welded using conventional techniques in the configuration shown in FIGS. 2-4.

The handle 24 includes an extension 50 and a grip 52. Although the extension may be formed from other materials, the extension 50 of the example tool 20 is formed from 1 inch square steel tubing abutting the striking plate 30 opposite the impact surface 44. The handle 24 is welded to the striking plate 30 and collar 32 as shown. The extension 50 is of a length sufficient to separate the worker's hand holding the grip 52 from the impact surface 44 of the striking plate 30 to reduce a possibility of contacting the worker's hand while impacting the impact surface. Further, the extension 50 is sized to permit a work to manipulate the tool 20. In the illustrated example, the grip 42 is made from a suitable synthetic rubber material to dampen forces transmitted through the handle 50 when the impact surface 44 is struck with the hammer. The illustrated grip 42 is available from Emgo International Ltd. of Austell, Ga.

Figure 6:
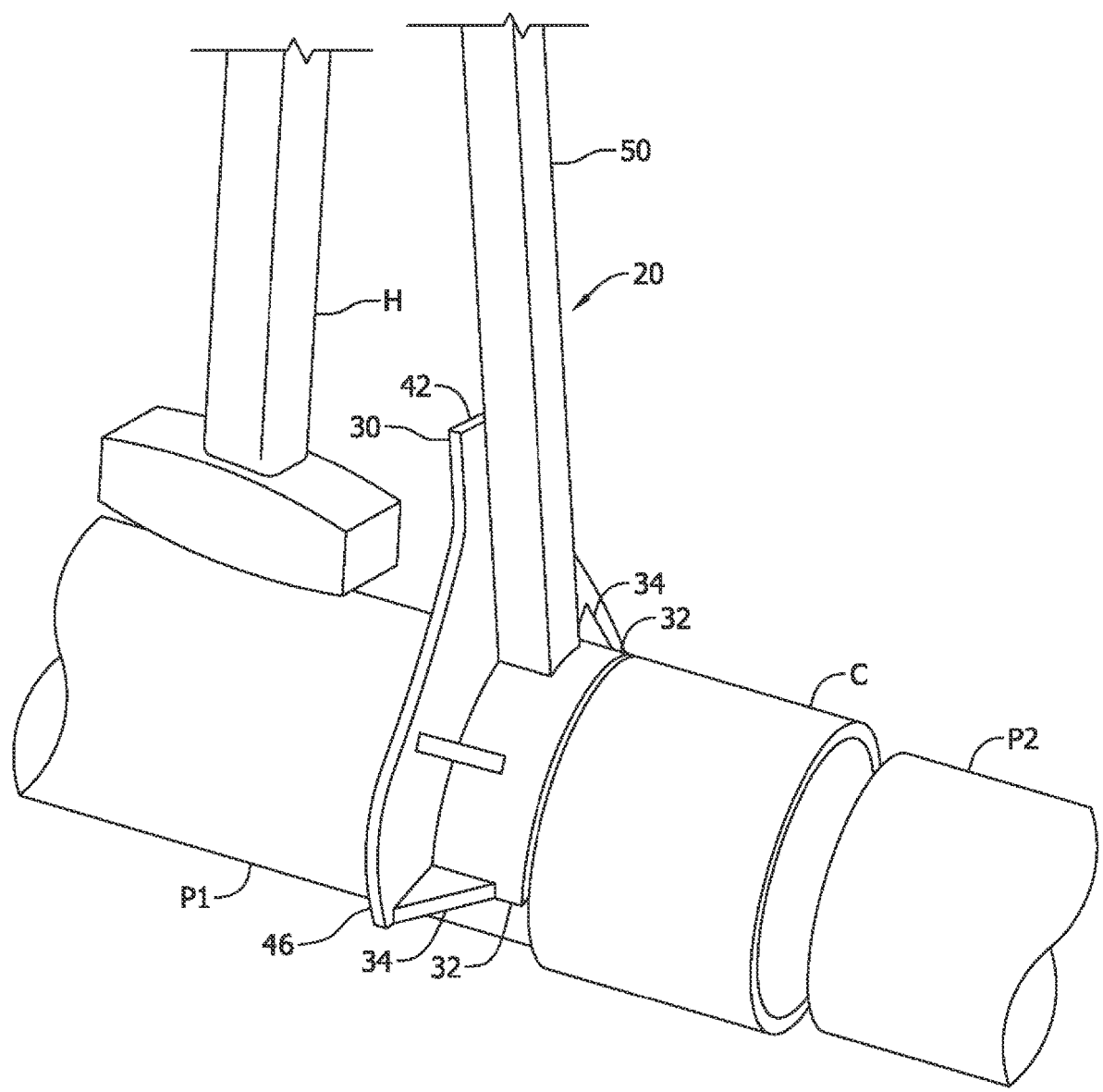
FIG. 6 is a fragmentary perspective of the tool in use.

In use, the worker grasps the grip 52 of the tool 20 and positions the inner surface 36 of the collar 32 against a first pipe P1 so the rearward end face 38 of the collar is adjacent the slip coupling C as shown in FIGS. 5 and 6. The worker then taps the striking plate 30 with a hammer H to move the coupling over the adjacent end of the second pipe P2. Although a gap is shown in FIG. 6 between the abutted ends of the first pipe P1 and the second pipe P2, in practice the gap is minimized.

In a first detailed example, a worker locates a broken section of pipe such as by using a conventional push video camera manipulated through the interior of the lateral sewer line. The worker excavates earth above and around the broken pipe. In some examples, the worker uses a mini excavator and shovel to excavate the earth. Once the broken section is exposed, the worker cuts the exposed pipe at opposite ends of the broken section and removes the broken section. In some examples, the work uses a reciprocating saw to cut the pipe. A suitable replacement section of pipe is cut to length and trial fit in position between the cut ends of the original pipe.

Figure 7A:
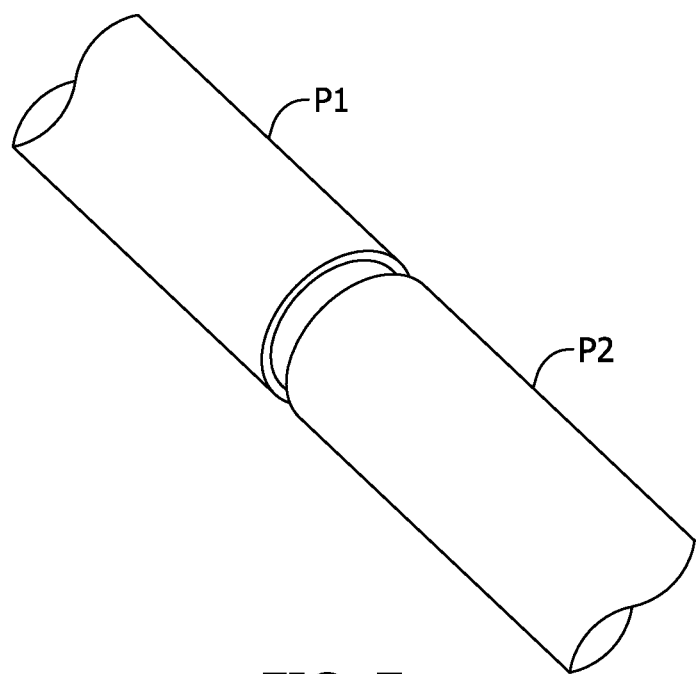
FIG. 7a-e are fragmentary perspectives showing pipe and a coupling during stages of a first method of repair.
Figure 7B:
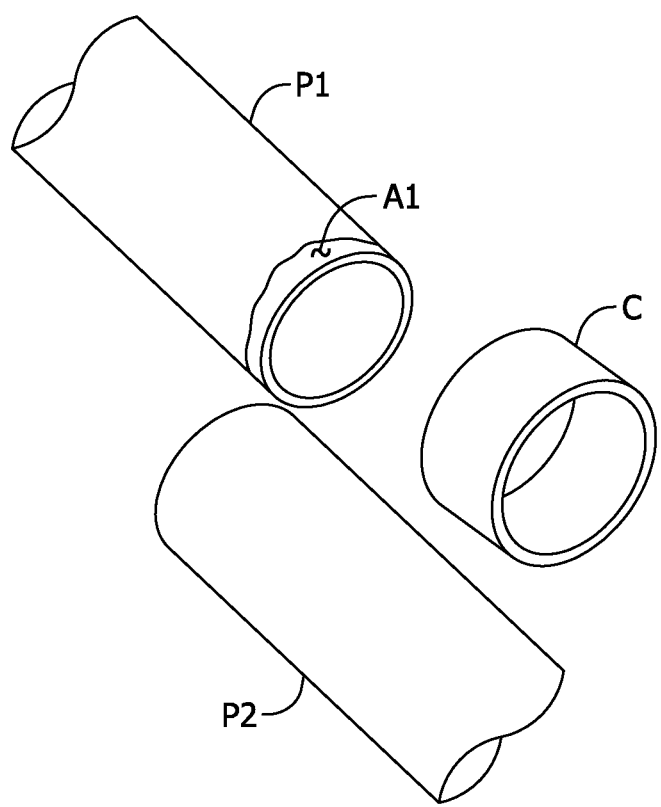
Figure 7C:
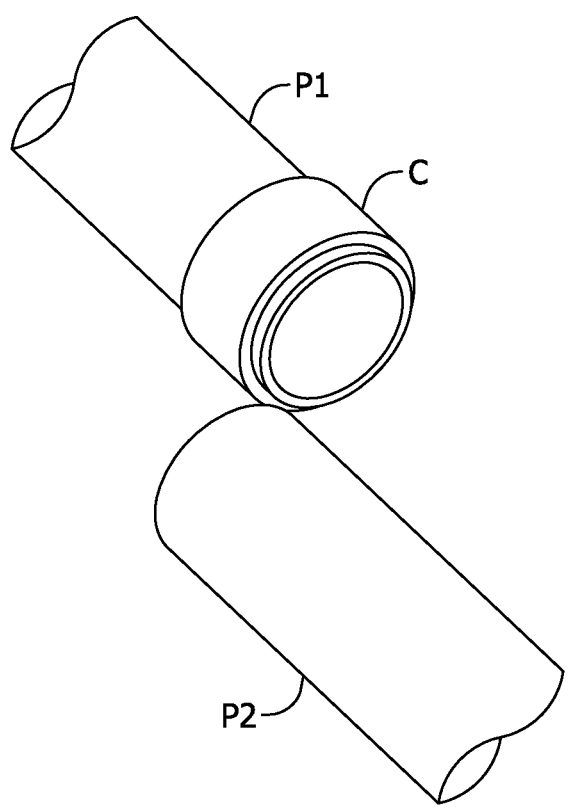
Figure 7D:
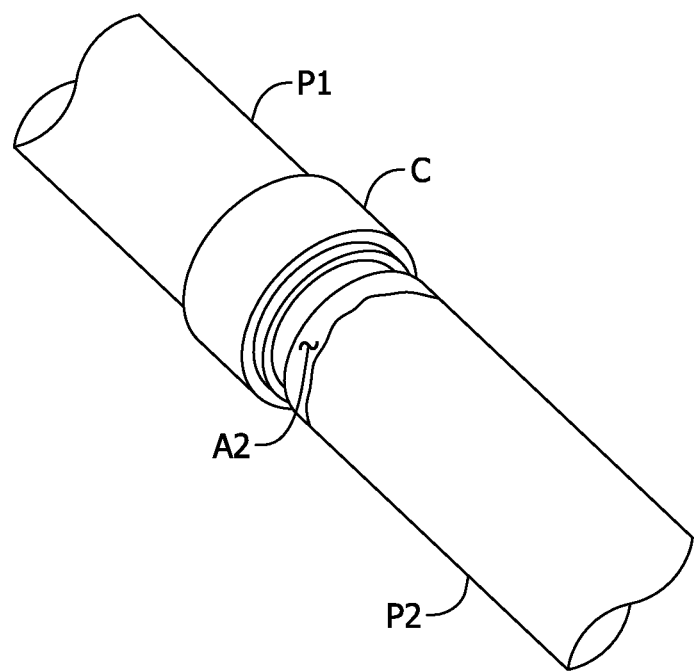
Figure 7E:
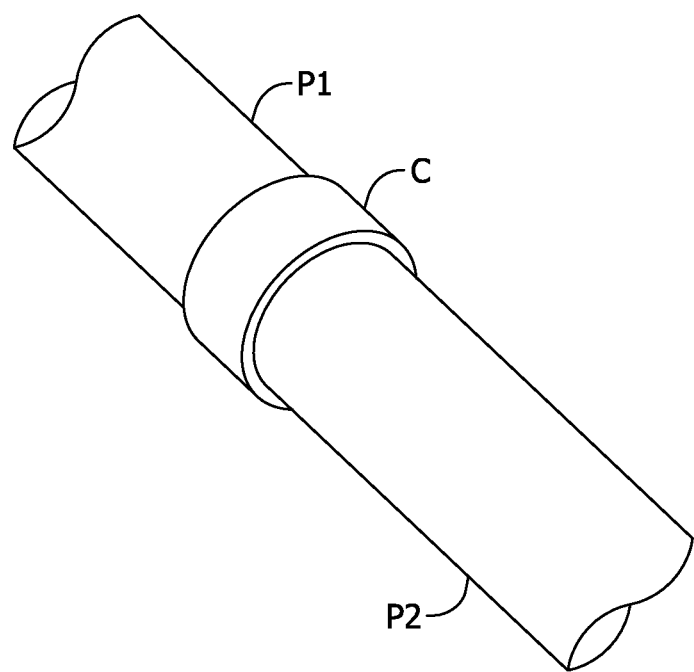

As shown in FIG. 7a, a replacement section of SD 40 PVC pipe is designated P1 and an original section of schedule 40 pipe is designated P2. The replacement section P1 is laterally offset from the original pipe section P2 as shown in FIG. 7b. An area A1 of a butt end of the replacement pipe section P1 is treated with an adhesive system. For example, area A1 may be coated with a clear primer available from Hercules Industries, Inc. of Denver, Colo., and then coated with clear PVC cement, which is also available from Hercules. Although other applicators may be used, in the illustrated example the primer and cement are applied with a brush. The interior of a slip coupling C is similarly treated before the coupling is slid into position over the coated butt end of the replacement pipe section P1 as illustrated in FIG. 7c. The striking plate 30 of the tool 20 may be used to tap the slip coupling C into this position over the coated butt end of the replacement pipe section P1. Once the coupling C is in the position shown in FIG. 7c, the replacement pipe section P1 is repositioned so the butt ends of the replacement pipe section P1 and the original pipe section P2 are axially aligned and adjacent one another as shown in FIG. 7d. An area A2 of the butt end of the original pipe section P2 is treated with the adhesive system. Finally, the tool 20 is positioned as in FIG. 6, and the slip coupling C is driven into the position shown in FIG. 7e so the abutted ends of the replacement pipe section P1 and the original pipe section P2 are centered along the slip coupling C. After repair with the replacement pipe section P1, the repaired pipe may be buried using conventional methods.

Figure 8:
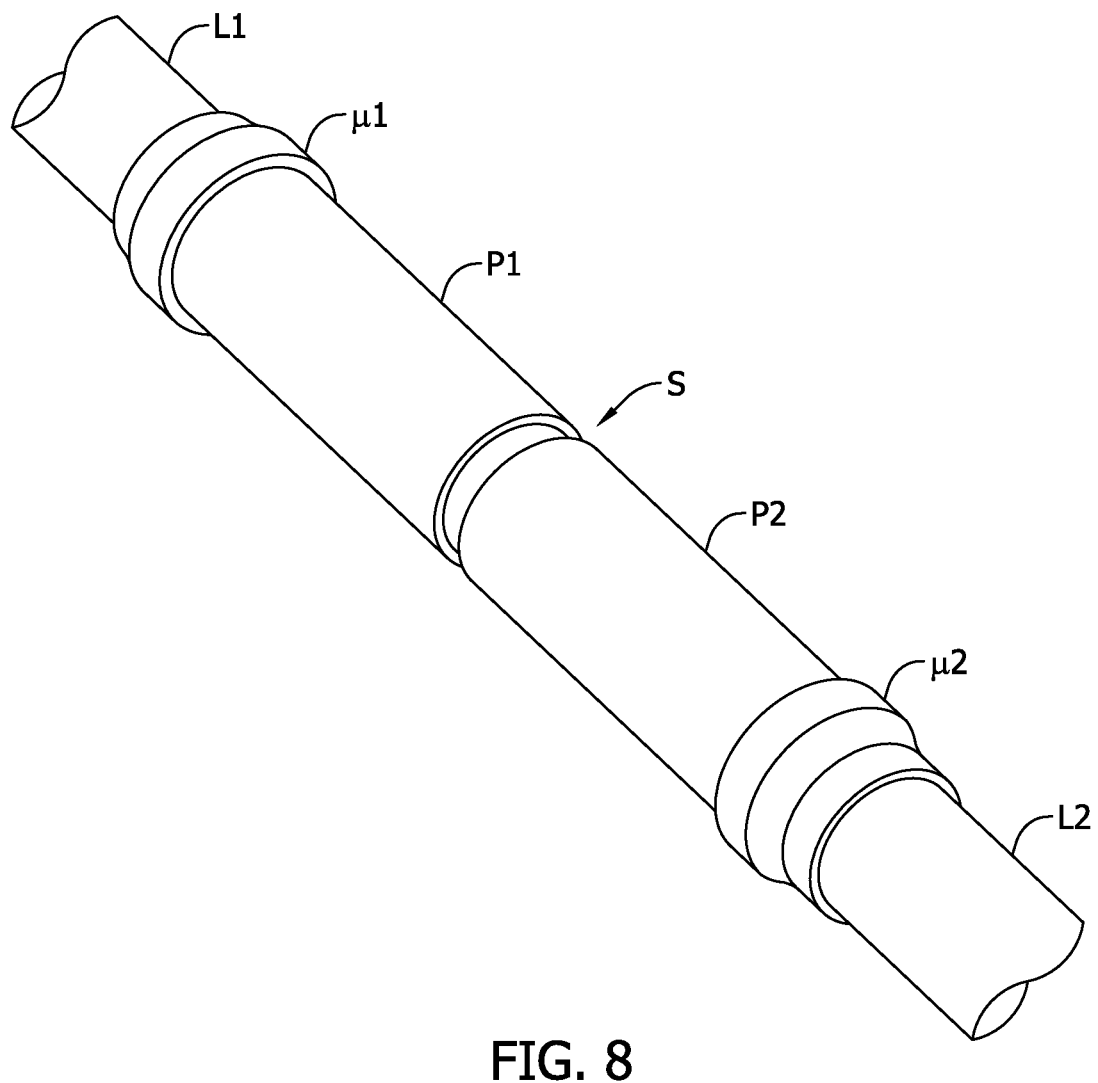
FIG. 8 is a fragmentary perspective showing pipe and couplings during a second method of repair.

FIG. 8 illustrates a second detailed example in which the damaged section is located and excavated as in the previous example. A damaged section of pipe (not shown) is removed from a lateral sewer line leaving spaced sewer pipe sections L1 and L2. In this example, the lateral sewer line is SDR 35 PVC D 3034 pipe. Conventional adapter unions U1 and U2 are bonded to the ends of the sewer pipe sections L1 and L2 as shown. Appropriate lengths of SD 40 PVC pipe P1 and P2 are cut using conventional techniques and bonded to the unions U1 and U2. The joint J between the sections of SD 40 PVC pipe P1 and P2 is joined as described in the previous example.

Figure 9:
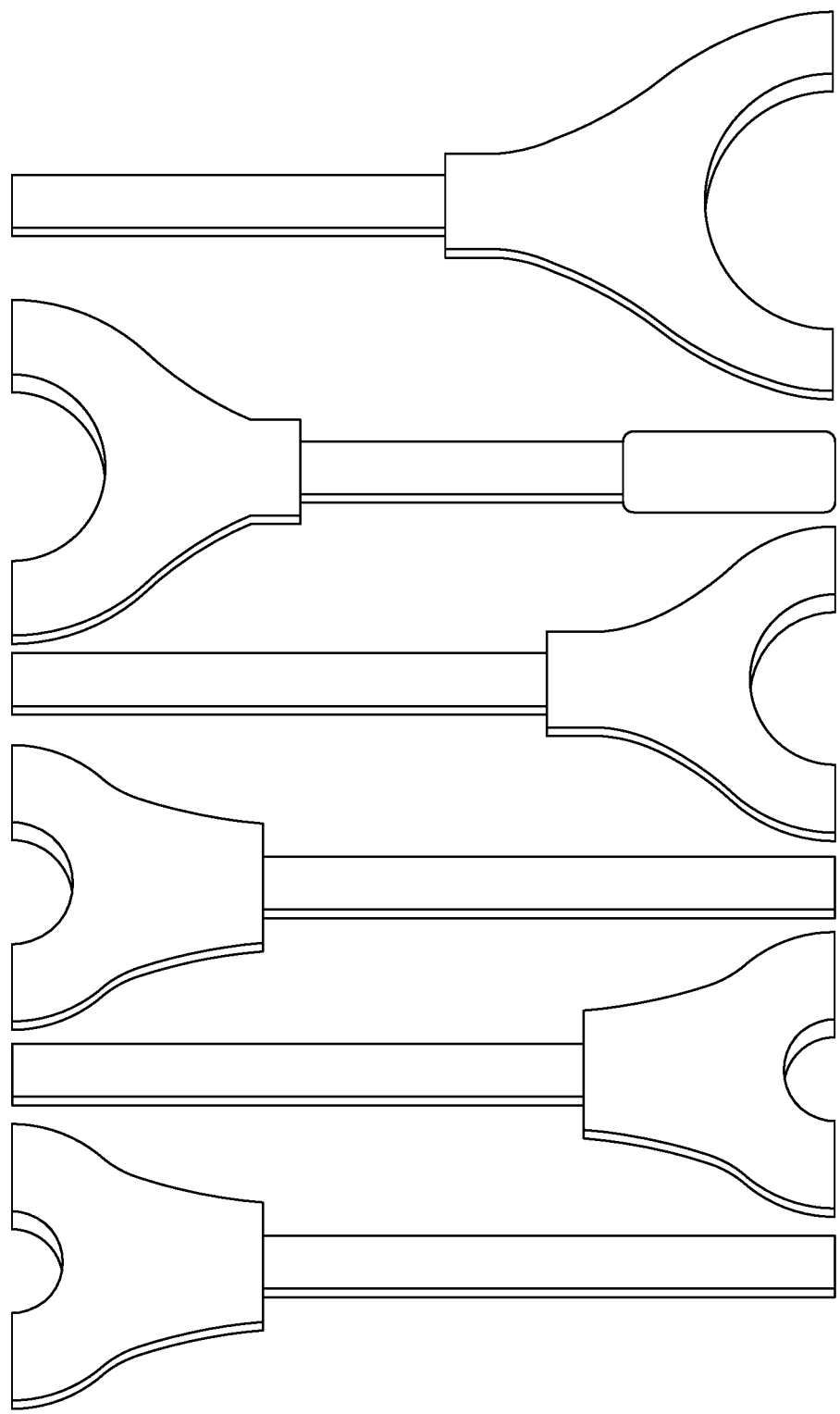
FIG. 9 is a perspective showing a set of tools configured for use with pipe and couplings of different sizes.

The tools 20 may be sized so that the collar 32 accepts different nominal pipe sizes. For example, a set of tools such as shown in FIG. 9 may consist of tools adapted for use with pipes having nominal diameters of 1.25, 1.50, 2, 3, 4, 5, and 6 inches. Other sizes such as 8, 10, and 12 inch diameters or larger are also envisioned.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A slip coupling tool for use when positioning a tubular slip coupling on pipe having an exterior surface, said slip coupling having an interior surface sized for receiving the pipe extending between opposite ends, said coupling tool comprising:
    a semi-annular collar having a circular inner surface sized to engage the exterior surface of the pipe, said inner surface extending between a forward end face and a rearward end face opposite said forward end face sized and shaped for aligning with a first end of said opposite ends of the slip coupling when the interior surface of the slip coupling receives the pipe, and the inner surface of the collar engages the exterior surface of the pipe;
    a striking plate extending outward from the forward end face of the collar, said striking plate having an impact surface spaced from the collar for impacting the coupling tool to drive the slip coupling into a predetermined position along the pipe; and
    a handle extending outward from the collar for engaging the inner surface of the collar with the exterior surface of the pipe and aligning the rearward end face of the collar with said first end of the slip coupling while impacting the impact surface of the striking plate to drive the slip coupling into the predetermined position along the pipe;
    wherein the circular inner surface of the semi-annular collar partially surrounds a center axis of the semi-annular collar, and the central axis of the semi-annular collar extends normal to the impact surface.

2. A slip coupling tool as set forth in claim 1, wherein the striking plate includes an inner end and an outer end, said inner end having a semi-circular inner margin corresponding to the forward end face of the collar to transmit impact loading to the collar when the impact surface of the coupling tool is impacted to drive the slip coupling into the predetermined position.

3. A slip coupling tool as set forth in claim 2, wherein the inner end of the striking plate includes a semi-annular flange extending outward from the forward end face of the collar, said flange including the semi-circular inner margin aligned with the forward end face of the collar.

4. A slip coupling tool as set forth in claim 3, wherein the impact surface of the striking plate extends outward from the flange.

5. A slip coupling tool as set forth in claim 4, further comprising a plurality of gussets extending between the striking plate and the collar.

6. A slip coupling tool as set forth in claim 4, wherein the handle abuts the striking plate opposite the impact surface.

7. A slip coupling tool as set forth in claim 1, wherein the handle extends outward to a grip opposite the collar.

8. A slip coupling tool as set forth in claim 7, wherein the grip is spaced from the impact surface of the striking plate.

9. A slip coupling tool as set forth in claim 7, wherein the grip is adapted to dampen forces transmitted through the handle when the impact surface is impacted.

10. A slip coupling tool as set forth in claim 1, wherein:
    said slip coupling tool is a first slip coupling tool in a set comprising said first slip coupling tool and a second slip coupling tool having a configuration generally similar to that of the first slip coupling tool; and
    the semi-annular collar of said second slip coupling tool having a circular inner surface sized to engage the exterior surface of a pipe having a different outer diameter than the pipe for which the circular inner surface of the collar of said second slip coupling tool is sized.

* * * * *